US009416798B2

(12) United States Patent
Uenishi et al.

(10) Patent No.: US 9,416,798 B2
(45) Date of Patent: Aug. 16, 2016

(54) HYDRAULIC CIRCUIT, AND COMBINATION VALVE USED IN SAME HYDRAULIC CIRCUIT

(71) Applicant: U-TEC CO., LTD., Osaka (JP)

(72) Inventors: Yukio Uenishi, Osaka (JP); Yuji Kondo, Osaka (JP)

(73) Assignee: U-Tec Co., Ltd., Osaka (JP)

( * ) Notice: Subject to any disclaimer, the term of this patent is extended or adjusted under 35 U.S.C. 154(b) by 393 days.

(21) Appl. No.: 14/236,089

(22) PCT Filed: Mar. 29, 2013

(86) PCT No.: PCT/JP2013/059661
§ 371 (c)(1),
(2) Date: Jan. 30, 2014

(87) PCT Pub. No.: WO2013/150985
PCT Pub. Date: Oct. 10, 2013

(65) Prior Publication Data

US 2014/0190158 A1 Jul. 10, 2014

(30) Foreign Application Priority Data

Apr. 5, 2012 (JP) ................................ 2012-086768
Mar. 26, 2013 (JP) ................................ 2013-064386

(51) Int. Cl.
*F16D 31/02* (2006.01)
*F15B 11/08* (2006.01)
(Continued)

(52) U.S. Cl.
CPC ............. *F15B 11/08* (2013.01); *F15B 11/0423* (2013.01); *F15B 13/0839* (2013.01);
(Continued)

(58) Field of Classification Search
CPC ............... F15B 11/0423; F15B 11/055; F15B 13/0839; F15B 15/202; F15B 2211/45; F16H 61/4043; F16H 61/4052
See application file for complete search history.

(56) References Cited

U.S. PATENT DOCUMENTS

2015/0082784 A1* 3/2015 Uenishi ................ F15B 21/041 60/464

FOREIGN PATENT DOCUMENTS

JP 53-48991 U 4/1978
JP 63-56304 U 4/1988
(Continued)

OTHER PUBLICATIONS

International Preliminary Report on Patentability issued in corresponding International Application No. PCT/JP2013/059661, mailed Oct. 16, 2014 (11 pages).
(Continued)

*Primary Examiner* — Michael Leslie
(74) *Attorney, Agent, or Firm* — Osha Liang LLP

(57) ABSTRACT

A composite valve is used in a hydraulic circuit. The composite valve is interposed between a stack valve and a hydraulic power supplier and between the stack valve and a multifunction valve coupled to a hydraulic device. The composite valve includes: stop valves opening/closing communication between the hydraulic power supplier and the stack valve and stop valves opening/closing communication between the stack valve and the multifunction valve; and bypass circuits respectively including stop valves opening/closing communication between the hydraulic power supplier and the multifunction valve, the bypass circuits provided closer to the hydraulic power supplier than the stop valves. This structure makes it possible to simultaneously perform various functions: repair, checking, and/or maintenance on the stack valve; flushing; and repair, checking, maintenance, and/or a trial run of the hydraulic device. The composite valve has uniform circuit configurations, which facilitates production of the valve.

4 Claims, 11 Drawing Sheets

(51) Int. Cl.

| | |
|---|---|
| ***F15B 11/042*** | (2006.01) |
| ***F15B 13/08*** | (2006.01) |
| ***F15B 21/00*** | (2006.01) |
| ***F15B 21/04*** | (2006.01) |
| *F15B 13/02* | (2006.01) |
| *E02B 7/20* | (2006.01) |

(52) U.S. Cl.

CPC ............ *F15B21/005* (2013.01); *F15B 21/041* (2013.01); *E02B 7/20* (2013.01); *F15B 13/021* (2013.01); *F15B 2211/3058* (2013.01); *F15B 2211/40576* (2013.01); *F15B 2211/41509* (2013.01); *F15B 2211/41536* (2013.01); *F15B 2211/45* (2013.01); *F15B 2211/611* (2013.01); *F15B 2211/85* (2013.01); *F15B 2211/864* (2013.01); *F15B 2211/8636* (2013.01)

(56) References Cited

FOREIGN PATENT DOCUMENTS

| | | | |
|---|---|---|---|
| JP | 63-92804 | A | 4/1988 |
| JP | 3696850 | B2 | 9/2005 |
| JP | 2005-351430 | A | 12/2005 |
| JP | 2011-231924 | A | 11/2011 |
| JP | 2012-67903 | A | 4/2012 |
| JP | 2012-127493 | A | 7/2012 |
| WO | 2012/144412 | A1 | 10/2012 |

OTHER PUBLICATIONS

International Search Report for corresponding International Application No. PCT/JP2013/059661, mailed Apr. 23, 2013 (4 pages).

Hirose Valve Industry Co., Ltd.; "Maintenance Valve JMV-RMV Series;" CAT.No. 1020-14 (16 Pages).

* cited by examiner

HYDRAULIC CIRCUIT, AND COMBINATION VALVE USED IN SAME HYDRAULIC CIRCUIT

CROSS-REFERENCE TO RELATED APPLICATIONS

The present application is a national stage application of PCT/JP2013/059661 filed Mar. 29, 2013, which claims priority to Japanese Patent Application No. 2013-064386, filed Mar. 26, 2013, and Japanese Patent Application No. 2012-086768, filed Apr. 5, 2012. The priority application is hereby incorporated by reference in its entirety.

TECHNICAL FIELD

The present invention relates to a hydraulic circuit which makes it possible to perform maintenance, as needed, on valves and/or a hydraulic device such as a hydraulic cylinder and a hydraulic motor coupled to the hydraulic circuit (for a reciprocating hydraulic cylinder used in an apparatus for driving a floodgate or in a factory facility, hydraulic oil merely moves in the circuit but does not circulate through the circuit, whereas for the hydraulic motor, hydraulic oil circulates through the circuit), or to perform various functions such as flushing on a circuit for the hydraulic device and an emergency action, and also relates to a composite valve used in the hydraulic circuit.

BACKGROUND ART

Examples of the floodgate driven by the hydraulic cylinder include a tilting gate apparatus constructed crossing a river. Such a tilting gate apparatus is used for effective use of water resources of the river by controlling the degree of tilting of the tilting gate provided crossing the river. Further, such an apparatus is used for preventing mixing of seawater with fresh water when provided at an estuary, and used for tide prevention when provided at a shore. Meanwhile, examples of the factory facility include various hydraulic devices used in a machining center.

In the tilting gate apparatus for effective use of water resources, piers are provided on both sides of the tilting gate provided crossing the river, and in each of the piers, there are provided a shaft secured to the tilting gate, and a cam secured to the shaft and rotated by the hydraulic cylinder. The degree of tilting of the gate is controlled through the shaft coupled to the cam provided in each pier and rotated by the hydraulic cylinder. Meanwhile, examples of the machining center include a hydraulic clamper for clamping a workpiece.

A circuit for driving the reciprocating hydraulic cylinder used for operating the tilting gate is divided by the hydraulic cylinder, and merely the amount of hydraulic oil needed for operating the hydraulic cylinder (the amount corresponding to the capacity of the hydraulic cylinder) travels back and forth in the circuit. Therefore, the hydraulic oil in the circuit and in the hydraulic cylinder does not circulate. Accordingly, longtime use may cause contamination of the hydraulic oil with a contaminant such as a piece of a sealing member broken by a diesel explosion caused by adiabatic compression, in the hydraulic cylinder, of a dust having entered into the circuit or the hydraulic cylinder, or of air having entered from a sealed portion of the hydraulic cylinder. As well, the hydraulic motor of the factory facility has a problem that a contamination of hydraulic oil caused by damage to a sealing member or by metal powder produced by friction between a rotating portion of the hydraulic motor and a body of the motor causes a malfunction in a control device such as a control valve and a speed adjustment valve.

The control device in which a malfunction occurs due to the contaminated hydraulic oil needs to be disassembled and cleaned to eliminate the cause of the malfunction, in order to properly control the hydraulic cylinder. Generally, before a malfunction occurs, such a control device needs maintenance and inspection to prevent the malfunction. Further, if a malfunction occurs in the hydraulic device such as the hydraulic cylinder and the hydraulic motor due to the above-described contamination, the malfunction has to be resolved, and to prevent the malfunction, maintenance and inspection are needed. Conventionally, for a hydraulic circuit, a configuration shown in FIG. 9 has been widely known as a circuit for repair, inspection, maintenance, disassembly and cleaning, or regular checking on such a control device.

The hydraulic circuit of Non Patent Literature 1 shown in FIG. 9 is the circuit for the hydraulic cylinder; however, the circuit may be used for a hydraulic motor. Therefore, in the following description, the hydraulic cylinder represents the hydraulic devices. In the hydraulic circuit shown in FIG. 9, a pile-up type stack valve 80 constituted by a lower stack valve 87 and an upper stack valve 88 is coupled to a hydraulic power supplier 10 and a hydraulic cylinder 61. The lower stack valve 87 includes a maintenance valve unit 81 and a maintenance valve unit 86, while the upper stack valve 88 includes a speed adjustment valve unit 82, a load check valve unit 84, and a solenoid switching valve unit 85.

Hydraulic pressure oil discharged from a hydraulic pump 11 of the hydraulic power supplier 10 in the above circuit passes through a manifold 89, the maintenance valve unit 86 of the lower stack valve 87, stop valves 81*a* and 81*b* of the maintenance valve 81, and the speed adjustment valve unit 82 of the upper stack valve 88, and then reaches a solenoid switching valve 85*a* of the solenoid switching valve unit 85. The direction of the flow of the hydraulic oil to/from a hydraulic device 60 is switched using the solenoid switching valve 85*a*. The hydraulic oil is supplied to/discharged from the hydraulic cylinder 61 of the hydraulic device 60 through speed adjustment valves 82*a* and 82*b* of the speed adjustment valve unit 82 and stop valves 86*a* and 86*b* of the maintenance valve unit 86.

In the above structure, the hydraulic oil from the hydraulic power supplier 10 is supplied/discharged so that a rod 65 of the hydraulic cylinder 61 moves from one position toward the other position, through operation on the solenoid switching valve 85*a* of the solenoid switching valve unit 85.

In the conventional art having the above structure and functions, when trouble occurs in any of the valves included in the upper stack valve 88 where delicate control devices of the pile-up type stack valve 80 are collectively disposed, or when inspection and maintenance are needed, the stop valves 81*a* and 81*b* of the maintenance valve 81 and the stop valves 86*a* and 86*b* of the maintenance valve 86 are closed thereby to close the communication between the hydraulic power supplier 10 and the hydraulic device 60; and then the upper stack valve 88 of the pile-up type stack valve 80 is detached, to perform repair, inspection, and/or maintenance.

CITATION LIST

Non Patent Literature

Non Patent Literature 1: A brochure of a maintenance valve published on the website of Hirose Valve Industry Co., Ltd.

SUMMARY OF INVENTION

Technical Problem

To perform repair, inspection, and/or maintenance on the upper stack valve 88, the circuit for the hydraulic cylinder mentioned in the above Non Patent Literature 1 and another hydraulic circuit including the pile-up type stack valve 80 used in this circuit are closed by the maintenance valve 81 and the maintenance valve 86. Therefore, there is a problem that a trial run of the hydraulic cylinder 61 and/or flushing of the circuit cannot be performed during the repair, inspection, and/or maintenance (mending) of the upper stack valve 88. In other words, the hydraulic power supplier has to be stopped during repair, inspection, and/or maintenance (mending) of the stack valve.

The present invention provides a hydraulic circuit which makes it possible to perform repair, inspection, and/or maintenance on a stack valve of the hydraulic circuit and/or on a hydraulic device to/from which hydraulic oil is supplied/discharged through the circuit while driving a hydraulic power supplier, and to perform flushing of the circuit in parallel with repair, inspection, and/or maintenance on the stack valve and/or on the hydraulic device.

Solution to Problem

A hydraulic circuit of an aspect of the present invention includes: a hydraulic power supplier including a tank configured to store hydraulic oil, and a hydraulic pump coupled to the tank and configured to feed hydraulic pressure oil; a stack valve coupled to the hydraulic power supplier, the stack valve including a direction switching valve configured to control supply/discharge of the hydraulic pressure oil from the hydraulic power supplier to a hydraulic device; a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve. The composite valve includes: a multifunction valve-side first passage including a multifunction valve-side first stop valve configured to open/close communication between the multifunction valve and the stack valve; a multifunction valve-side second passage including a multifunction valve-side second stop valve configured to open/close communication between the multifunction valve and the stack valve; a pump-side passage including a pump-side stop valve configured to open/close communication between the hydraulic pump and the stack valve; a tank-side passage including a tank-side stop valve configured to open/close communication between the tank and the stack valve; a pump-side bypass circuit branching off from the pump-side passage at a position closer to the pump than the pump-side stop valve, the pump-side bypass circuit including a pump-side bypass stop valve configured to open/close communication with the multifunction valve-side first passage; and a tank-side bypass circuit branching off from the tank-side passage at a position closer to the tank than the tank-side stop valve, the tank-side bypass circuit including a tank-side stop valve configured to open/close communication with the multifunction valve-side second passage.

A hydraulic circuit of another aspect of the present invention includes: a hydraulic power supplier including a tank configured to store hydraulic oil, and a hydraulic pump coupled to the tank and configured to feed hydraulic pressure oil; a stack valve coupled to the hydraulic power supplier, the stack valve including a direction switching valve configured to control supply/discharge of the hydraulic pressure oil from the hydraulic power supplier to a hydraulic device; a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve. The composite valve includes: a multifunction valve-side first passage including a multifunction valve-side first stop valve configured to open/close communication between the multifunction valve and the stack valve; a multifunction valve-side second passage including a multifunction valve-side second stop valve configured to open/close communication between the multifunction valve and the stack valve; a pump-side passage including a pump-side stop valve configured to open/close communication between the hydraulic pump and the stack valve; a tank-side passage including a tank-side stop valve configured to open/close communication between the tank and the stack valve; a pump-side bypass circuit branching off from the pump-side passage at a position closer to the pump than the pump-side stop valve, the pump-side bypass circuit including a pump-side bypass stop valve configured to open/close communication with the multifunction valve-side second passage; and a tank-side bypass circuit branching off from the tank-side passage at a position closer to the tank than the tank-side stop valve, the tank-side bypass circuit including a tank-side stop valve configured to open/close communication with the multifunction valve-side first passage.

A hydraulic circuit of still another aspect includes: a hydraulic power supplier including a tank configured to store hydraulic oil, and a hydraulic pump coupled to the tank and configured to feed hydraulic pressure oil; a stack valve coupled to the hydraulic power supplier, the stack valve including a direction switching valve configured to control supply/discharge of the hydraulic pressure oil from the hydraulic power supplier to a hydraulic device; a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve. The composite valve includes: a multifunction valve-side first passage including a multifunction valve-side first stop valve configured to open/close communication between the multifunction valve and the stack valve; a multifunction valve-side second passage including a multifunction valve-side second stop valve configured to open/close communication between the multifunction valve and the stack valve; a pump-side passage including a pump-side stop valve configured to open/close communication between the hydraulic pump and the stack valve; a tank-side passage including a tank-side stop valve configured to open/close communication between the tank and the stack valve; and a direction switching valve configured to change a manner of communication of the pump-side passage and the tank-side passage with the multifunction valve-side first passage and the multifunction valve-side second passage.

The hydraulic circuit of the present invention includes the hydraulic power supplier, the composite valve, the stack valve, and the multifunction valve attached to the hydraulic device. The composite valve has a function of closing communication between the stack valve and the hydraulic power supplier and between the stack valve and the multifunction valve, and a function of opening/closing communication between the hydraulic power supplier (a pump side and a tank side thereof) and the multifunction valve. The multifunction valve has a function of opening/closing the supply/discharge circuits for the hydraulic cylinder and bypassing the hydraulic cylinder.

In the hydraulic circuit of each aspect the present invention, the composite valve closes communication between the stack valve and the hydraulic power supplier and between the stack valve and the hydraulic cylinder to separate the stack valve. This makes it possible to perform repair, inspection, and/or maintenance on the stack valve irrespective of the status of the hydraulic cylinder and the hydraulic power supplier. When the composite valve further establishes a circulation circuit by opening communication between the hydraulic pump and the multifunction valve and the multifunction valve closes the supply/discharge circuits for the hydraulic cylinder while opening the bypass circuit, it is possible to perform flushing, in which pressure oil discharged from the hydraulic pump is circulated. Furthermore, when the multifunction valve closes the bypass circuit while opening the supply/discharge circuits for the hydraulic cylinder, the hydraulic power supplier communicates with the hydraulic cylinder through operation on the composite valve, and this allows the hydraulic cylinder to operate irrespective of the stack valve. Moreover, it is possible to separate the hydraulic cylinder from the supply/discharge circuits by closing the supply/discharge circuits through operation on the multifunction valve, to perform upkeep, repair, inspection, and/or maintenance on the hydraulic cylinder.

Thus, in the hydraulic circuit including the hydraulic power supplier, the composite valve, the stack valve, and the multifunction valve attached to the hydraulic device, the stack valve is separable from the other components because of the presence of the composite valve, and this reliably prevents entry of foreign matter (contaminant) from the other components during repair, inspection, and/or maintenance. Further, through the operation on the composite valve and the multifunction valve, various operations such as maintenance (upkeep) and a trial run are performed on the hydraulic cylinder and the supply/discharge circuits for the hydraulic cylinder. It is possible to perform repair, inspection, and/or maintenance on the stack valve in parallel with repair, inspection, maintenance on the hydraulic cylinder and the supply/discharge circuits for the hydraulic cylinder. Furthermore, during the above operations such as maintenance (upkeep), foreign matter generated in an operation on one member is advantageously prevented from entering the other members.

A composite valve used in the hydraulic circuit of the present invention has a composite valve unit 30*a* which includes: a P-port coupled to a hydraulic pump, a T-port coupled to a tank circuit, an A-port coupled to a first supply/discharge circuit, and a B-port coupled to a second supply/discharge circuit; and a P1-port connected with the P-port, a T1-port connected with the T-port, an A1-port connected with the A-port, and a B1-port connected with the B-port. The composite valve unit 30*a* further includes: a first section including (i) a first left passage structure connecting the P-port with the P1-port, the first left passage structure including a first left U-shape passage including a lower passage provided with a pump-side stop valve, and (ii) a first right passage structure connecting the T-port with the T1-port, the first right passage structure including (a) a first right U-shape passage including a lower passage which is positioned substantially coaxially with an upper passage of the first left U-shape passage and is provided with a tank-side stop valve, and (b) a first T-shape passage which is positioned substantially coaxially with the lower passage of the first left U-shape passage and is provided with a tank-side bypass stop valve; and a second section including (i) a second right passage structure connecting the A-port with the A1-port, the second right passage structure including a second right U-shape passage including a lower passage provided with a multifunction valve-side second stop valve, and (ii) a second left passage structure connecting the B-port with the B-port, the second left passage structure including (a) a second left U-shape passage including a lower passage which is positioned substantially coaxially with an upper passage of the second right U-shape passage and is provided with a multifunction valve-side first stop valve, and (b) a second T-shape passage which is positioned coaxially with the lower passage of the second right U-shape passage and is provided with a pump-side bypass stop valve. The first left passage structure is substantially same as the second right passage structure while the first right passage structure is substantially same as the second left passage structure when either one of the first section and the second section is rotated 180 degrees in a horizontal direction, and a pump-side bypass circuit couples the lower passage of the first left passage structure of the first section with the second T-shape passage of the second section via the pump-side bypass stop valve, while a tank-side bypass circuit couples the lower passage of the second right passage structure of the second section with the first T-shape passage of the first section via the tank-side bypass stop valve.

In the composite valve of the above structure, function-intensive circuits are formed in the two sections, and the function-intensive circuits are substantially the same as each other in configuration when either one of the sections is rotated in its longitudinal direction and overlaps the other. Thus, the function-intensive circuits are uniform, leading to a simple structure. This brings about an advantageous effect of better productivity of the composite valve.

BRIEF DESCRIPTION OF DRAWINGS

FIG. 6(*b*) is a circuit diagram of a composite valve of a variation of the first embodiment.

FIG. 7(*b*) is a circuit diagram for describing the operation in the first embodiment.

DESCRIPTION OF EMBODIMENTS

First Embodiment

The following describes a first embodiment, which is a preferred embodiment of the present invention, with reference to FIGS. 1 to 7.

Figure 1:
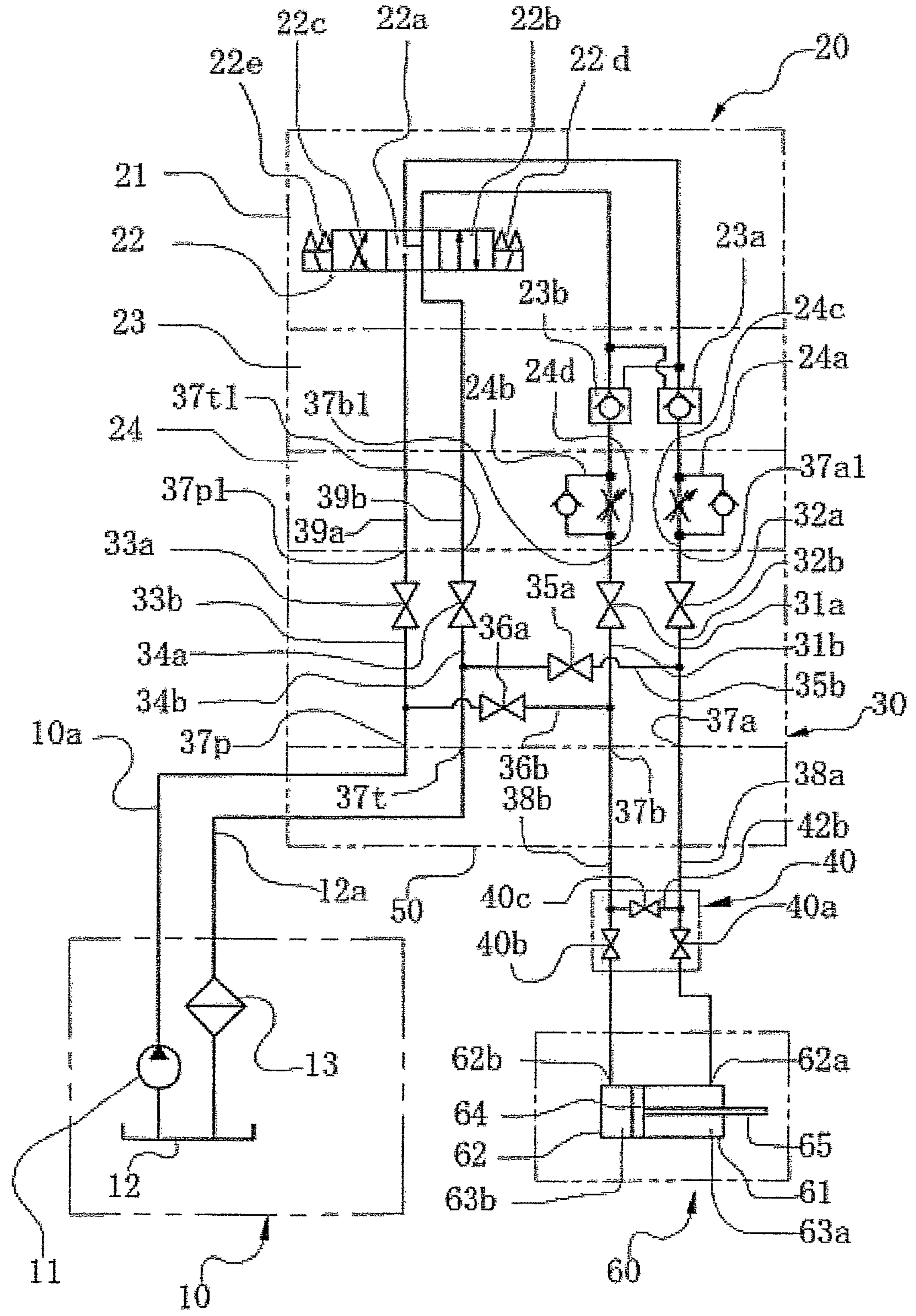
FIG. 1 is a diagram of a hydraulic circuit of a first embodiment of the present invention.

A hydraulic circuit shown in FIG. 1, which is an embodiment of the present invention, includes: a hydraulic power supplier 10 including a hydraulic pump 11, a tank 12, and a filter 13; a hydraulic device 60 including a hydraulic cylinder 61; a multifunction valve 40 provided in the vicinity of the hydraulic device 60; and a manifold 50 coupled to the hydraulic power supplier 10 and to the multifunction valve 40. On the manifold 50, a composite valve 30 and a stack valve 20 are provided.

The relation between the multifunction valve 40 and the hydraulic device 60 is as follows: the multifunction valve 40 is directly attached to a cylinder body 62 of the hydraulic cylinder 61 of the hydraulic device 60 as described in Japanese Patent No. 3696850. The multifunction valve 40 has a function of enabling flushing of the circuit and a function of enabling detachment of the hydraulic device 60, and therefore, the multifunction valve 40 is preferably attached to the body of the hydraulic device.

The stack valve 20 is stacked on the composite valve 30 mounted on the manifold 50. The stack valve 20 includes: a direction switching valve unit 21 including a direction switching valve 22; a load check valve unit 23 including two load check valves 23*a* and 23*b*; and a speed control valve unit 24 including speed control valves 24*a* and 24*b* which control the speed of operation of the hydraulic device 60.

The direction switching valve 22 of the direction switching valve unit 21 of the stack valve 20 has a neutral position 22*a*, a right position 22*b*, and a left position 22*c*. In response to a signal applied to a solenoid portion 22*d* or 22*e*, the valve is shifted to the right position 22*b* or the left position 22*c*. When no signal is applied to the solenoid portions 22*d* and 22*e*, the valve is held in the neutral position 22*a* by means of a spring.

Composite Valve

The composite valve 30 will be described with reference to FIG. 6(*a*) which is the circuit diagram of the composite valve. The composite valve 30 includes: a multifunction valve-side first passage 31*b* including a multifunction valve-side first stop valve 31*a* which opens/closes communication between the multifunction valve 40 and the stack valve 20; a multifunction valve-side second passage 32*b* including a multifunction valve-side second stop valve 32*a* which opens/closes communication between the multifunction valve 40 and the stack valve 20; a pump-side passage 33*b* including a pump-side stop valve 33*a* which opens/closes communication between the hydraulic pump 11 and the stack valve 20; a tank-side passage 34*b* including a tank-side stop valve 34*a* which opens/closes communication between the tank 12 and the stack valve 20; a pump-side bypass circuit 36*b* branching off from the pump-side passage 33*b* at a position closer to the hydraulic pump 11 than the pump-side stop valve 33*a*, and including a pump-side bypass stop valve 36*a* which opens/closes communication with the multifunction valve-side first passage 31*b*; and a tank-side bypass circuit 35*b*, branching off from the tank-side passage 34*b* at a position closer to the tank 12 than the tank-side stop valve 34*a*, and including a pump-side bypass stop valve 35*a* which opens/closes communication with the multifunction valve-side second passage 32*a*.

The multifunction valve-side first passage 31*b* is provided between a B-port 37*b* coupled to a second supply/discharge circuit 38*b* and a B1-port 37*b*1 coupled to a supply/discharge circuit 24*d* extending to the speed control valve 24*b*, and the multifunction valve-side first passage 31*b* is configured to be opened/closed by the multifunction valve-side first stop valve 31*a*. The multifunction valve-side second passage 32*b* is provided between an A-port 37*a* coupled to a first supply/discharge circuit 38*a* and an A1-port 37*a*1 coupled to a supply/discharge circuit 24*c* extending to the speed control valve 24*a*, and the multifunction valve-side second passage 32*b* is configured to be opened/closed by the multifunction valve-side second stop valve 32*a*. Thus, when the multifunction valve-side first stop valve 31*a* and the multifunction valve-side second stop valve 32*a* are closed, communication between the multifunction valve 40 and the stack valve 20 is closed.

The pump-side passage 33*b* is provided between a P-port 37*p* coupled to a pump circuit 10*a* and a P1-port 37*p*1 coupled to a supply/discharge circuit 39*a*, and the pump-side passage 33*b* is configured to be opened/closed by the pump-side stop valve 33*a*. The tank-side passage 34*b* is provided between a T-port 37*t* coupled to a tank circuit 12*a* and a T1-port 37*t*1 coupled to a supply/discharge circuit 39*b*, and the tank-side passage 34*b* is configured to be opened/closed by the tank-side stop valve 34*a*. Thus, when the pump-side stop valve 33*a* and the tank-side stop valve 34*a* are closed, communication between the stack valve 20 and the hydraulic power supplier 10 is closed.

The pump-side bypass circuit 36*b* is provided between the pump-side passage 33*b* and the multifunction valve-side first passage 31*b*, and the pump-side bypass circuit 36*b* is configured to be opened/closed by the pump-side bypass stop valve 36*a*. Meanwhile, the tank-side bypass circuit 35*b* is provided between the tank-side passage 34*b* and the multifunction valve-side second passage 32*b*, and the tank-side bypass circuit 35*b* is configured to be opened/closed by the tank-side bypass stop valve 35*a*. The above structure causes hydraulic oil to flow in a counterclockwise direction, as indicated with an arrow A in FIG. 6(*a*).

Figure 6A:
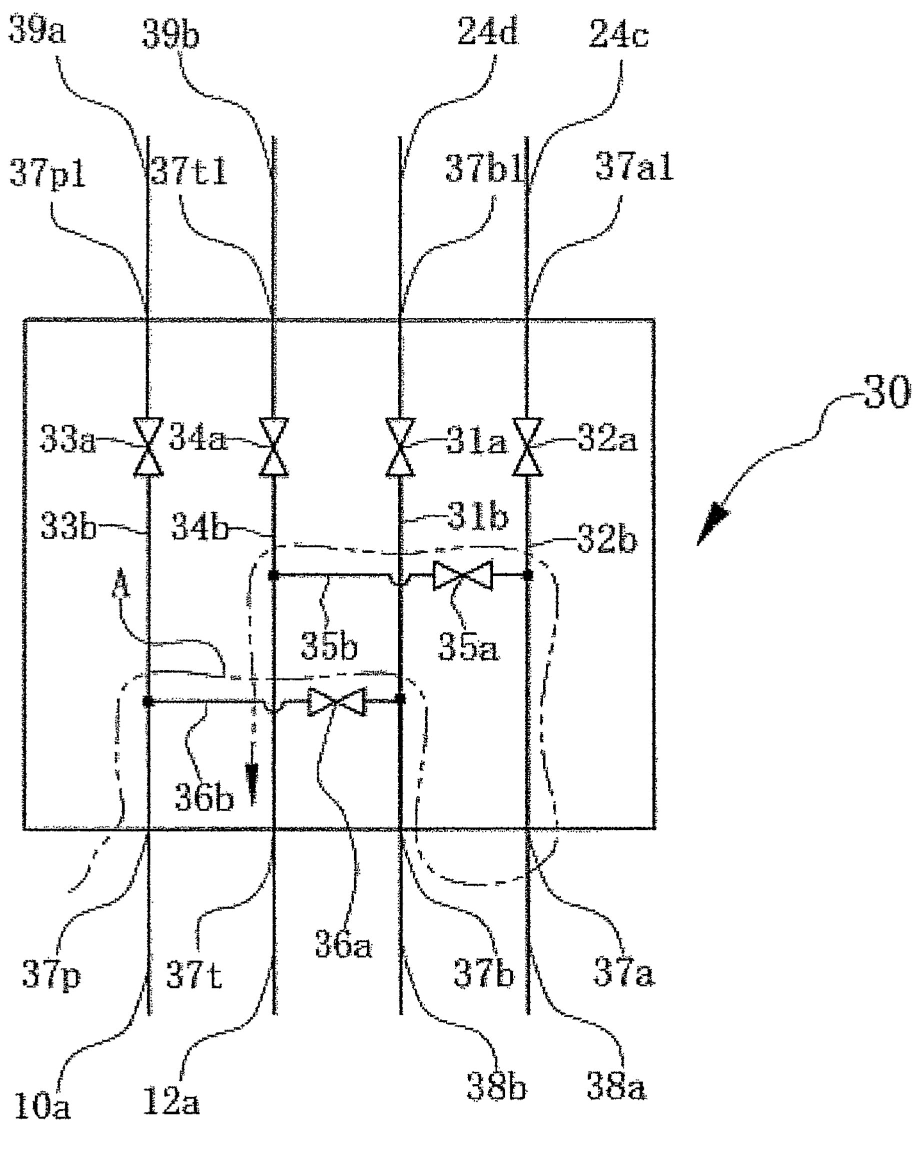
FIG. 6(*a*) is a circuit diagram of the composite valve of the first embodiment.
Figure 6B:
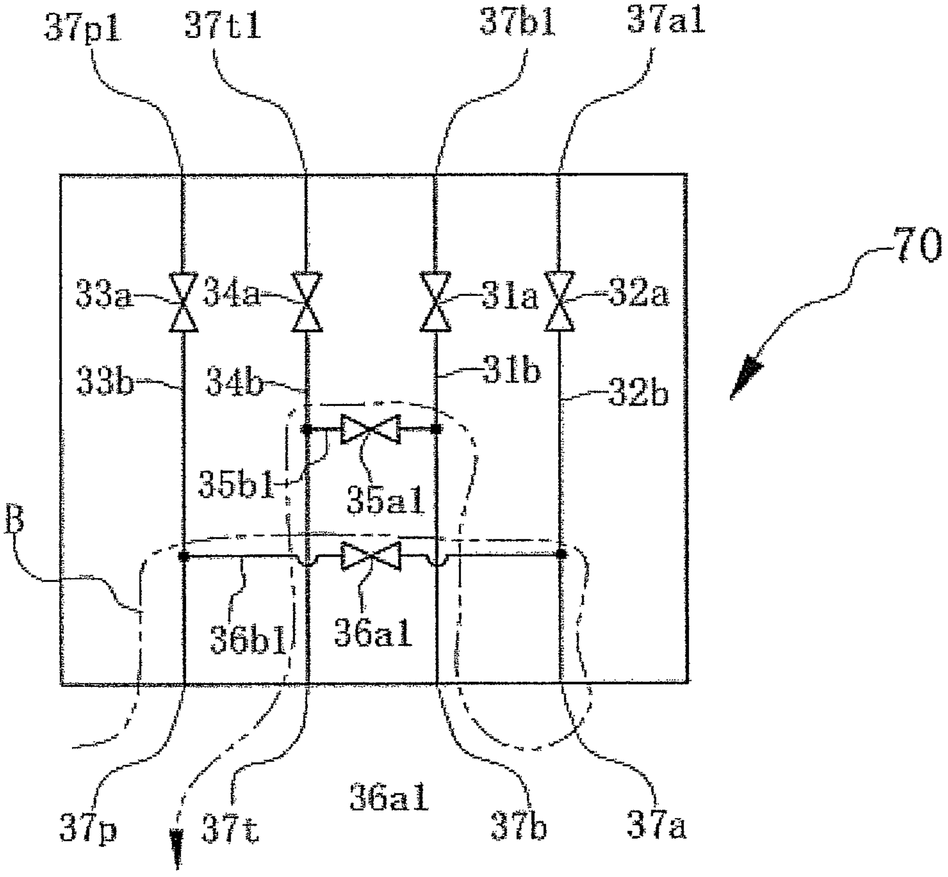

In the case where the tank circuit 12*a* is coupled to the P-port 37*p* in FIG. 6(*a*) and the pump circuit 10*a* is coupled to the T-port 37*t*, the hydraulic oil flows in a clockwise direction, similarly to the flow in a composite valve 70 shown in FIG. 6 (*b*).

The composite valve 70 shown in FIG. 6(*b*) has the same structure except the connection manner of the pump-side bypass circuit 36*b* and of the tank-side bypass circuit 35*b*. Specifically, a pump-side bypass circuit 36*b*1 connects the pump-side passage 33*b* with the multifunction valve-side second passage 32*b* and includes a pump-side bypass stop valve 36*a*1. Meanwhile, a tank-side bypass circuit 35*b*1 connects the tank-side passage 34*b* with the multifunction valve-side first passage 31*b* and includes a tank-side bypass stop valve 35*a*1.

The above differences in structure cause the following difference in operation: while the hydraulic oil flows in the composite valve 30 in the counterclockwise direction as indicated with the arrow A in FIG. 6(*a*), the hydraulic oil flows in the composite valve 70 in the clockwise direction as indicated with the arrow B in FIG. 6(*b*). The composite valves 30 and 70 are different from each other only in the manner of flow of the hydraulic oil, and the valves are substantially same as each other in the other structures. Therefore, the following description will be given for the composite valve 30, and the composite valve 70 will be described as needed.

Specific Structure of Composite Valve 30

The specific structure of the composite valve 30 will be described with reference to FIGS. 2 to 5. Note that the specific structure of each stop valve included in the composite valve 30 is substantially same as that of the valve disclosed in FIG. 2(*a*) of Japanese Unexamined Patent Publication No. 2011-231924 without multipurpose ports, and each stop valve is a typical poppet stop valve of which valve member is configured to open/close a passage through operation on a handle. Therefore, the detailed description of each stop valve is omitted.

Figure 2:
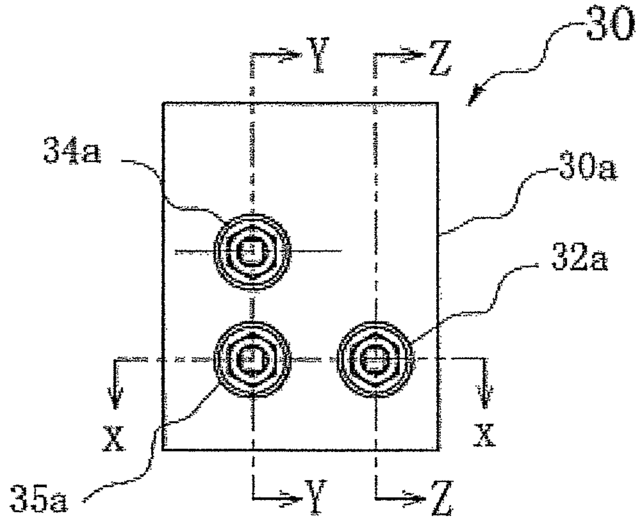
FIG. 2 is a side view of a composite valve of the first embodiment.

The specific structure of the composite valve 30 will be described with reference to three sections specified in FIG. 2 illustrating the composite valve unit 30*a*.

Figure 3:
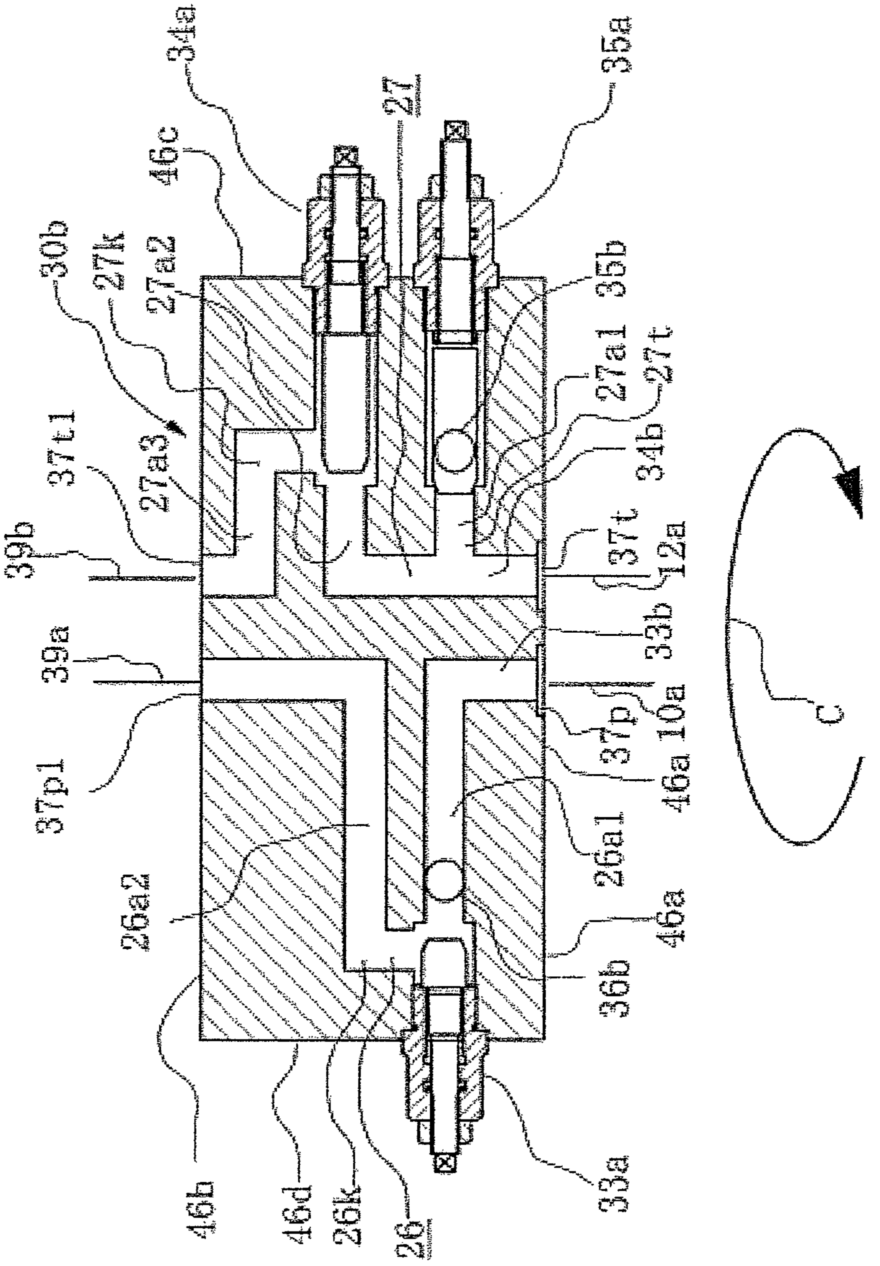
FIG. 3 is a sectional view taken along a line Y-Y in FIG. 2.
Figure 4:
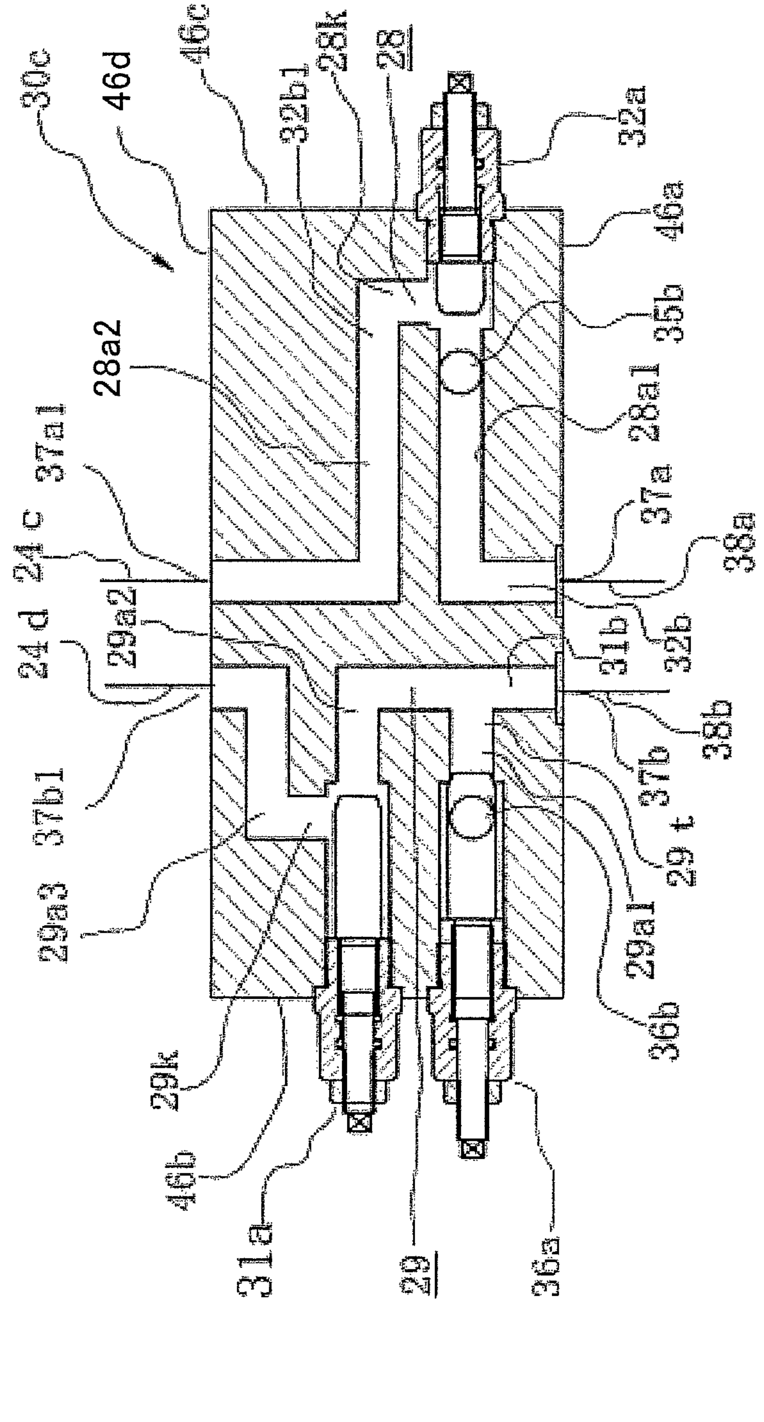
FIG. 4 is a sectional view taken along a line Z-Z in FIG. 2.
Figure 5:
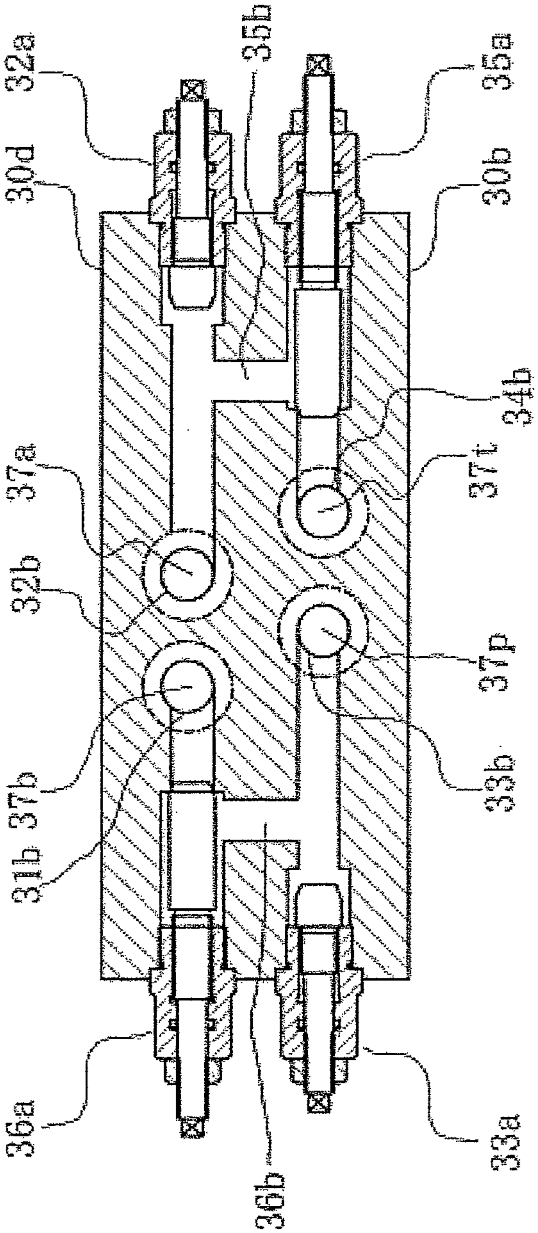
FIG. 5 is a sectional view taken along a line X-X in FIG. 2.

The composite valve 30 includes: a first section 30*b* of FIG. 3, which is the section taken along the line Y-Y in FIG. 2; a second section 30*c* of FIG. 4, which is the section taken along the line Z-Z in FIG. 2; and a third section 30*d* of FIG. 5, which is the section taken along the line X-X in FIG. 2. The first section 30*b* and the second section 30*c* are parallel to each other, and these two sections cross the third section 30*d*. The stop valves are arranged in these sections for easy design of the composite valve.

The first section 30*b* shown in FIG. 3 includes: the P-port 37*p* coupled to the pump circuit 10*a*, and the P1-port 37*p*1 configured to communicate with the P-port 37*p* via the pump-side stop valve 33*a* and coupled to the supply/discharge circuit 39*a*; and the T-port 37*t* coupled to the tank circuit 12*a* of the hydraulic power supplier 10, and the T1-port 37*t*1 configured to communicate with the T-port 37*t* via the tank-side stop valve 34*a* and coupled to the supply/discharge circuit 39*b*.

The second section 30*c* shown in FIG. 4 includes: the B-port 37*b* coupled to the second supply/discharge circuit 38*b* coupled to a port 62*b* of the hydraulic cylinder 61, and the B1-port 37*b*1 configured to communicate with the B-port 37*b* via the multifunction valve-side first stop valve 31*a* and coupled to the supply/discharge circuit 24*d* coupled to the speed control valve 24*b*; and the A-port 37*a* coupled to the first supply/discharge circuit 38*a* coupled to a port 62*a* of the hydraulic cylinder 61, and the A1-port 37*a*1 configured to communicate with the A-port 37*a* via the multifunction valve-side second stop valve 32*a* and coupled to the supply/discharge circuit 24*c* coupled to the speed control valve 24*a*.

The third section 30*d* shown in FIG. 5 is a plane crossing the first section 30*b* and the second section 30*c*. The third section 30*d* includes: the pump-side bypass stop valve 36*a* and the pump-side stop valve 33*a*; the tank-side bypass stop valve 35*a* and the multifunction valve-side second stop valve 32*a*; and the passages which are the multifunction valve-side first passage 31*b* and the multifunction valve-side second passage 32*b*, and the pump-side bypass circuit 36*b* and the tank-side bypass circuit 35*b*.

The composite valve 30 has a configuration such that the third section 30*d* crosses the two planes of the first section 30*b* and the second section 30*c*, thereby to improve its machinability.

The first section 30*b* shown in FIG. 3 includes: the pump-side passage 33*b* connecting the P-port 37*p* opening to an under surface 46*a* with the P1-port 37*p*1 opening to a top surface 46*b*; and the tank-side passage 34*b* connecting the T-port 37*t* opening to the under surface 46*a* with the T1-port 37*t*1 opening to the top surface 46*b*.

A first left passage structure 26 formed by the pump-side passage 33*b* includes a first left U-shape passage 26*k* having a lower passage 26*a*1 and an upper passage 26*a*2, and extending toward a left side surface 46*d*. Communication between the lower passage 26*a*1 and the upper passage 26*a*2 is opened/closed by the pump-side stop valve 33*a* provided coaxially with the lower passage 26*a*1. The lower passage 26*a*1 has an opening to communicate with the pump-side bypass circuit 36*b* at a position closer to the P-port 37*p*.

A first right passage structure 27 formed by tank-side passage 34*b* includes a lower passage 27*a*1, a middle passage 27*a*2, and an upper passage 27*a*3. The upper passage 27*a*3 and the middle passage 27*a*2 form a first right U-shape passage 27*k* extending toward a right side surface 46*c*, while the lower passage 27*a*1 forms a part of a T-shape passage 27*t* branching off from the tank-side passage 34*b*.

The lower passage 27*a*1 is configured to be opened/closed by the tank-side bypass stop valve 35*a*, and the lower passage 27*a*1 is formed coaxially with the lower passage 26*a*1 of the first left passage structure 26. The tank-side bypass stop valve 35*a* has an opening to communicate with the tank-side bypass circuit 35*b*. Further, the middle passage 27*a*2 is formed coaxially with the upper passage 26*a*2 of the first left passage structure 26 and is provided with the tank-side stop valve 34*a*. The tank-side stop valve 34*a* opens/closes communication between the middle passage 27*a*2 and the upper passage 27*a*3.

The second section 30*c* shown in FIG. 4 includes: the multifunction valve-side first stop valve 31*a* configured to open communication between the B-port 37*b* opening to the under surface 46*a* and the B1-port 37*b*1 opening to the top surface 46*b*; and the multifunction valve-side second stop valve 32*a* configured to open communication between the A-port 37*a* opening to the under surface 46*a* and the A1-port 37*a*1 opening to the top surface 46*b*.

A second right passage structure 28 formed by the multifunction valve-side second passage 32*b* includes a second right U-shape passage 28*k* having a lower passage 28*a*1 and an upper passage 28*a*2 and extending toward the right side surface 46*c*. Communication between the lower passage 28*a*1 and the upper passage 28*a*2 is opened/closed by the multifunction valve-side second stop valve 32*a* provided coaxially with the lower passage 28*a*1. The lower passage 28*a*1 has an opening to communicate with the tank-side bypass circuit 35*b* at a position closer to the A-port 37*a*.

A second left passage structure 29 formed by the multifunction valve-side first passage 31*b* includes a lower passage 29*a*1, a middle passage 29*a*2, and an upper passage 29*a*3. The upper passage 29*a*3 and the middle passage 29*a*2 form a second U-shape passage 29*k* extending toward the left fight side surface 46*d*, while the lower passage 29*a*1 forms a part of a second T-shape passage 29*t* branching off from the multifunction valve-side first passage 31*b*.

The lower passage 29*a*1 is configured to be opened/closed by the pump-side bypass stop valve 36*a*, and is formed coaxially with the lower passage 28*a*1 of the second right passage structure 28. The pump-side bypass stop valve 36*a* has an opening to communicate with the pump-side bypass circuit 36*b*. Further, the middle passage 29*a*2 is formed coaxially with the upper passage 28*a*2 of the second right passage structure 28, and is provided with the multifunction valve-side first stop valve 31*a*. The multifunction valve-side first stop valve 31*a* opens/closes communication between the middle passage 29*a*2 and the upper passage 29*a*3.

The third section 30*d* shown in FIG. 5 includes the tank-side bypass stop valve 35*a* of the first section 30*b* and the pump-side bypass stop valve 36*a* of the second section 30*c*, and the third section 30*d* is a horizontal section crossing the second section 30*c* and the first section 30*b*. The tank-side bypass circuit 35*b* and the pump-side bypass circuit 36*b* couples the second section 30*c* to the first section 30*b*.

In the composite valve 30 having the above-described structure, each set of stop valves are disposed coaxially with each other, and the passages for the stop valves are arranged on each of the planes, which are simply coupled by the third plane crossing these planes. This facilitates construction of the composite valve 30. Further, the composite valve 30 is configured so that, when the first section 30*b* is rotated 180 degrees in its longitudinal direction as indicated with an arrow C in FIG. 3, the first left passage structure 26 and the first right passage structure 27 are substantially same as the second right passage structure 28 and the second left passage structure 29, respectively.

Multifunction Valve

The multifunction valve 40 is attached in close proximity to the port 62*a* and the port 62*b* of the hydraulic cylinder 61. The multifunction valve 40 includes: a first stop valve 40*a* which opens/closes communication between the first supply/discharge circuit 38*a* coupled to the manifold 50 and the port 62*a* of the hydraulic cylinder 61; and a second stop valve 40*b* which opens/closes communication between the second supply/discharge circuit 38*b* coupled to the manifold 50 and the port 62*b* of the hydraulic cylinder 61. The multifunction valve 40 further includes a bypass circuit 42*b* having a third stop valve 40*c* which opens/closes communication between the first supply/discharge circuit 38*a* and the second supply/discharge circuit 38*b*.

The multifunction valve 40 has the following functions of: establishing communication between the first supply/discharge circuit 38*a* and the second supply/discharge circuit 38*b* by using the bypass circuit 42*b* with the first stop valve 40*a* and the second stop valve 40*b* closed and with the third stop valve 40*c* opened; and allowing the hydraulic cylinder 61 to carry out ordinary operation (i.e., reciprocation) when the third stop valve 40*c* is closed and the first stop valve 40*a* and the second stop valve 40*b* are opened. With the first stop valve 40*a* and the second stop valve 40*b* closed, it is possible to detach the hydraulic cylinder 61 to perform maintenance (upkeep), inspection, and/or repair on the hydraulic cylinder 61.

The multifunction valve 40 includes: the first stop valve 40*a* which opens/closes communication between the port 62*a* of the hydraulic cylinder 61 and the first supply/discharge circuit 38*a*; the second stop valve 40*b* which opens/closes communication between the second supply/discharge circuit 38*b* and the port 62*b* of the hydraulic cylinder 61; and the bypass circuit 42*b* branching off from the supply/discharge circuits at respective positions closer to the stack valve 20 than the first stop valve 40*a* and the second stop valve 40*b*, the bypass circuit 42*b* being opened/closed by the third stop valve 40*c*. The detailed structure of the multifunction valve 40 is substantially the same as the multifunction valve described in Japanese Patent No. 3696850, and therefore the detailed description thereof is omitted here.

Hydraulic Device

The hydraulic cylinder 61 included in the hydraulic device 60 is configured so that: when hydraulic pressure oil is supplied to a rod-side hydraulic chamber 63*a* of the cylinder body 62 via the port 62*a*, a rod 65 operates in a contracting direction; and when hydraulic pressure oil is supplied to a head-side pressure chamber 63*b*, the rod 65 operates in an extending direction.

Operation in First Embodiment

Figure 7A:
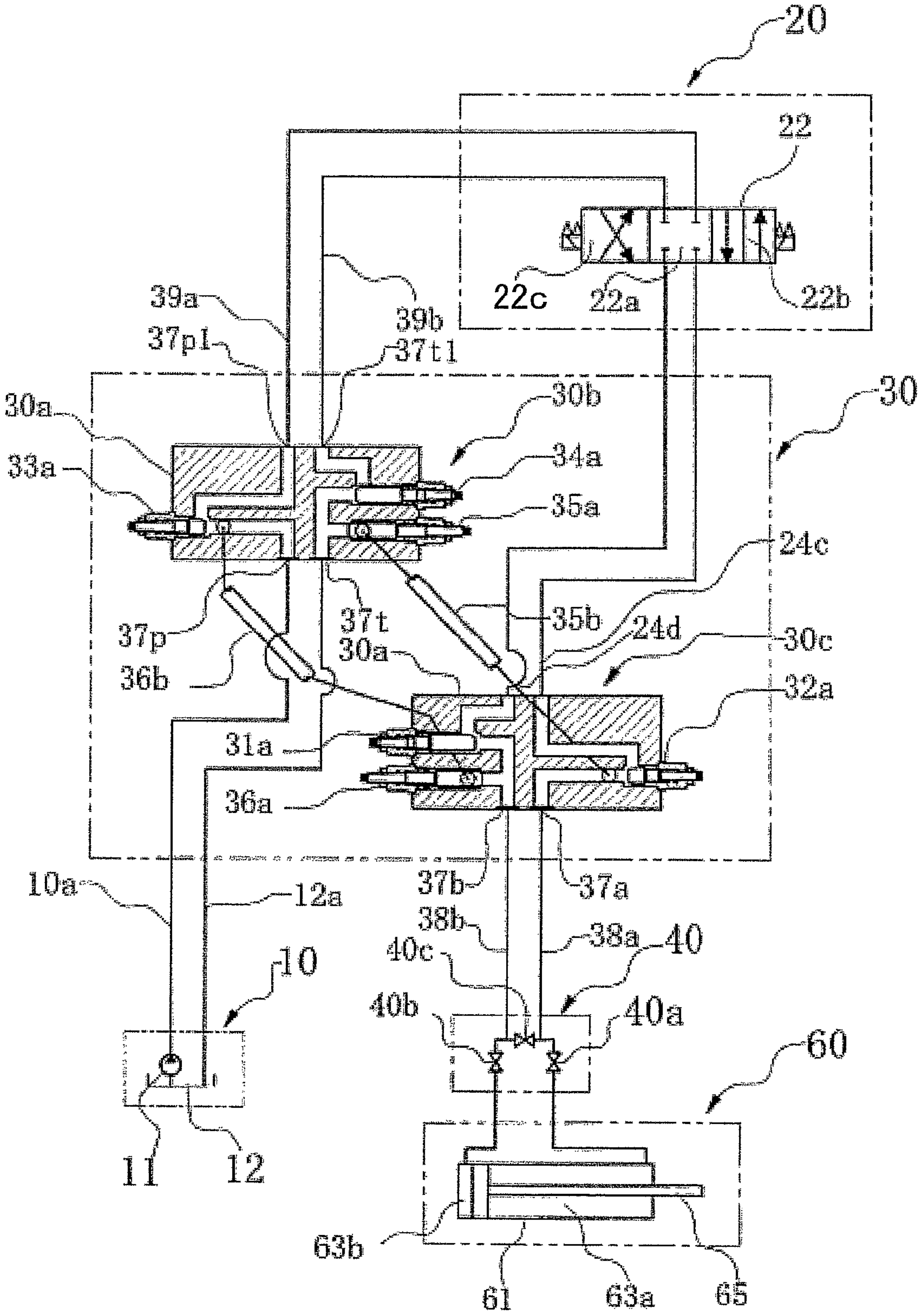
FIG. 7(*a*) is a circuit diagram for describing operation in the first embodiment.
Figure 7B:
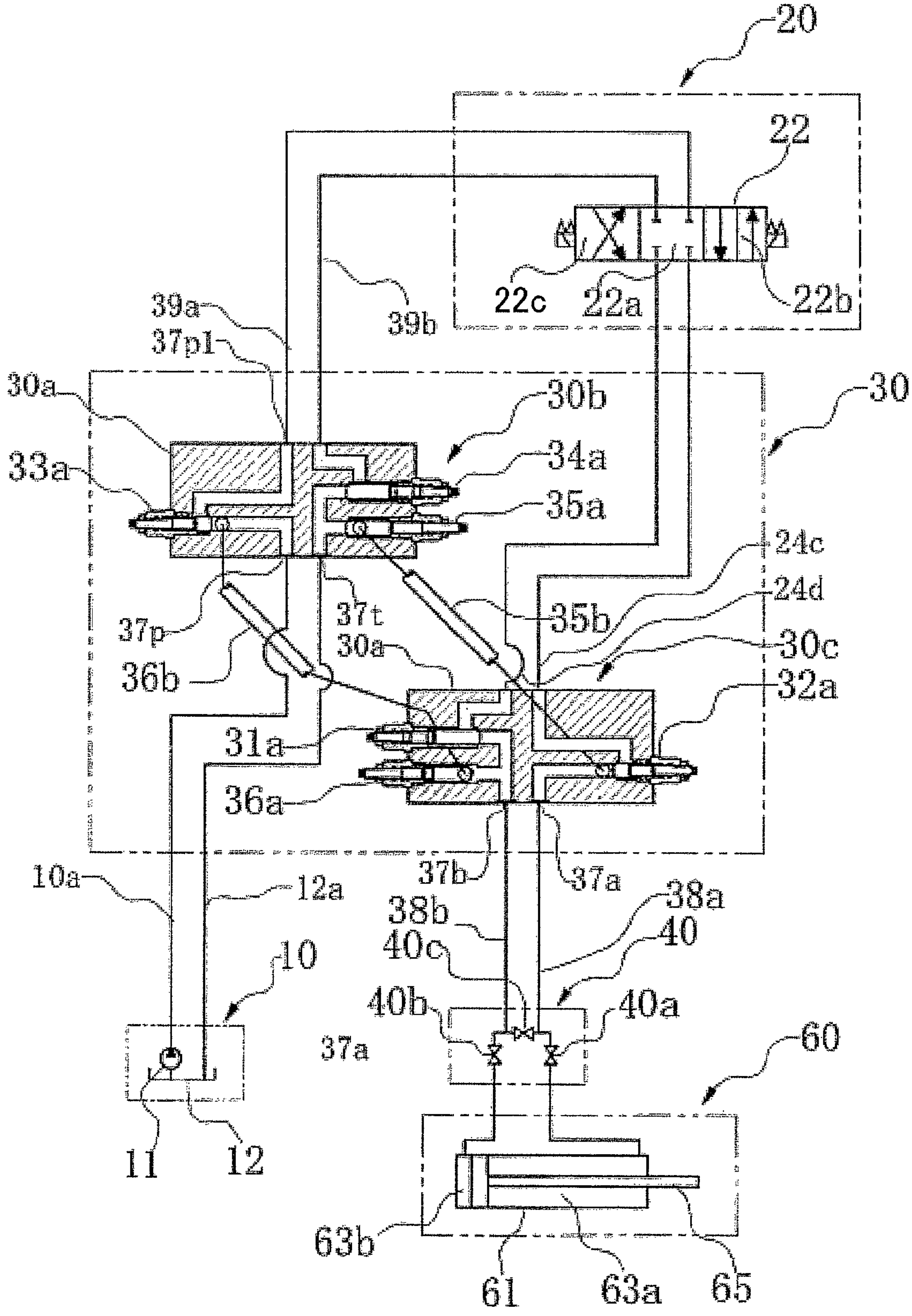

Operation in the first embodiment will be described with reference to FIGS. 7(*a*) and 7(*b*). In FIGS. 7(*a*) and 7(*b*), the load check valve unit 23 and the speed control valve unit 24 shown in FIG. 1 are omitted since these are less likely to be related to the operation in the present invention.

Ordinary Operation

Referring to FIG. 7(*a*), for the ordinary operation of the hydraulic cylinder 61 through operation on the direction switching valve 22 of the direction switching valve unit 21, first, the tank-side bypass stop valve 35*a* of the tank-side bypass circuit 35*b* and the pump-side bypass stop valve 36*a* of the pump-side bypass circuit 36*b* of the composite valve 30 are closed while the other stop valves of the composite valve 30 are opened. In addition, the third stop valve 40*c* of the multifunction valve 40 is closed while the other stop valves of the multifunction valve 40 are opened.

After the composite valve 30 and the multifunction valve 40 are set as described above, the direction switching valve 22 of the direction switching valve unit 21 is shifted to the right position 22*b*, and then, hydraulic oil from the hydraulic pump 11 is supplied, through the composite valve 30, the right position 22*b*, the load check valve unit 23, the speed control valve unit 24, the first supply/discharge circuit 38*a*, and the multifunction valve 40, to the rod-side hydraulic chamber 63*a*.

The hydraulic oil in the head-side pressure chamber 63*b* of the hydraulic cylinder 61 returns, through the multifunction valve 40, the second supply/discharge circuit 38*b*, the composite valve 30, the speed control valve unit 24, the load check valve unit 23, the right position 22*b*, and the composite valve 30, back to the tank 12, and therefore, the rod 65 of the hydraulic cylinder 61 operates in the contracting direction.

When the direction switching valve 22 is shifted to the left position 22*c* under the condition that the tank-side bypass stop valve 35*a* and the pump-side bypass stop valve 36*a* of the composite valve 30 and the third stop valve 40*c* of the multifunction valve 40 are closed as shown in FIG. 7(*a*), hydraulic oil is supplied to the head-side pressure chamber 63*b*, and the hydraulic oil in the rod-side hydraulic chamber 63*a* returns back to the tank 12, with the result that the rod 65 of the hydraulic cylinder 61 operates in the extending direction.

Thus, when the composite valve 30 and the multifunction valve 40 are held in the above-described condition, ordinary operation of the hydraulic cylinder 61 is performed through the operation on the direction switching valve 22 of the direction switching valve unit 21.

Regarding checking, repair, inspection, and maintenance of the stack valve, a trial run of the hydraulic cylinder, and flushing, description will be given first for repair, inspection, and maintenance of the stack valve 20, and a trial run of the hydraulic cylinder 61 with reference to FIG. 7(*b*).

For repair, inspection, and maintenance of the stack valve 20, the multifunction valve-side first stop valve 31*a*, the multifunction valve-side second stop valve 32*a*, the tank-side stop valve 34*a*, and the pump-side stop valve 33*a* of the composite valve 30 are closed as shown in FIG. 7(*b*). With this, the composite valve 30 closes communication between the stack valve 20 and the hydraulic cylinder 61, and between the stack valve 20 and the hydraulic power supplier 10, and this allows the stack valve 20 to be detached from the composite valve 30 to perform repair, inspection, maintenance and/or the like on the stack valve 20.

For a trial run of the hydraulic cylinder 61, the pump-side bypass stop valve 35*a* and the tank-side bypass stop valve 36*a* are opened under the above-described condition for repair, inspection, and/or maintenance of the stack valve 20, and further, the first stop valve 40*a* and the second stop valve 40*b* of the multifunction valve 40 are opened. This allows the hydraulic oil from the hydraulic power supplier 10 to be supplied to/discharged from the hydraulic cylinder 61, and thereby the rod 65 operates in the extending direction.

Meanwhile, flushing is performed in the following manner: under the above-described condition for repair, inspection, and/or maintenance of the stack valve 20, the pump-side bypass stop valve 35*a* and the tank-side bypass stop valve 36*a* are opened, and further, the third stop valve 40*c* of the multifunction valve 40 is opened with the first stop valve 40*a* and the second stop valve 40*b* thereof closed. This opens the bypass circuit 42*b*, and thereby allows the hydraulic oil to flow through the first supply/discharge circuit 38*a*, the bypass circuit 42*b*, the second supply/discharge circuit 38*b*, and the composite valve 30, to return back to the tank 12.

Since the composite valve 30 of the first embodiment shown in FIGS. 7(*a*) and 7(*b*) has the circuit configuration shown in FIG. 6(*a*), a discharging side of the hydraulic pump 11 is coupled to the head-side pressure chamber 63*b* of the hydraulic cylinder 61, while the tank 12 is coupled to the rod-side hydraulic chamber 63*a* of the hydraulic cylinder 61. Because of this, a trial run of the hydraulic cylinder 61 is performed only for the extending direction of the rod 65 of the hydraulic cylinder 61.

Meanwhile, when the composite valve 30 of the first embodiment shown in FIGS. 7(*a*) and 7(*b*) is modified so as to have the circuit configuration of the composite valve 70 shown in FIG. 6(*b*), the discharging side of the hydraulic pump 11 is coupled to the rod-side hydraulic chamber 63*a* of the hydraulic cylinder 61, while the tank 12 is coupled to the head-side pressure chamber 63*b* of the hydraulic cylinder 61. Because of this, a trial run of the hydraulic cylinder 61 is performed only for the contracting direction of the rod 65 of the hydraulic cylinder 61.

Second Embodiment

Figure 8:
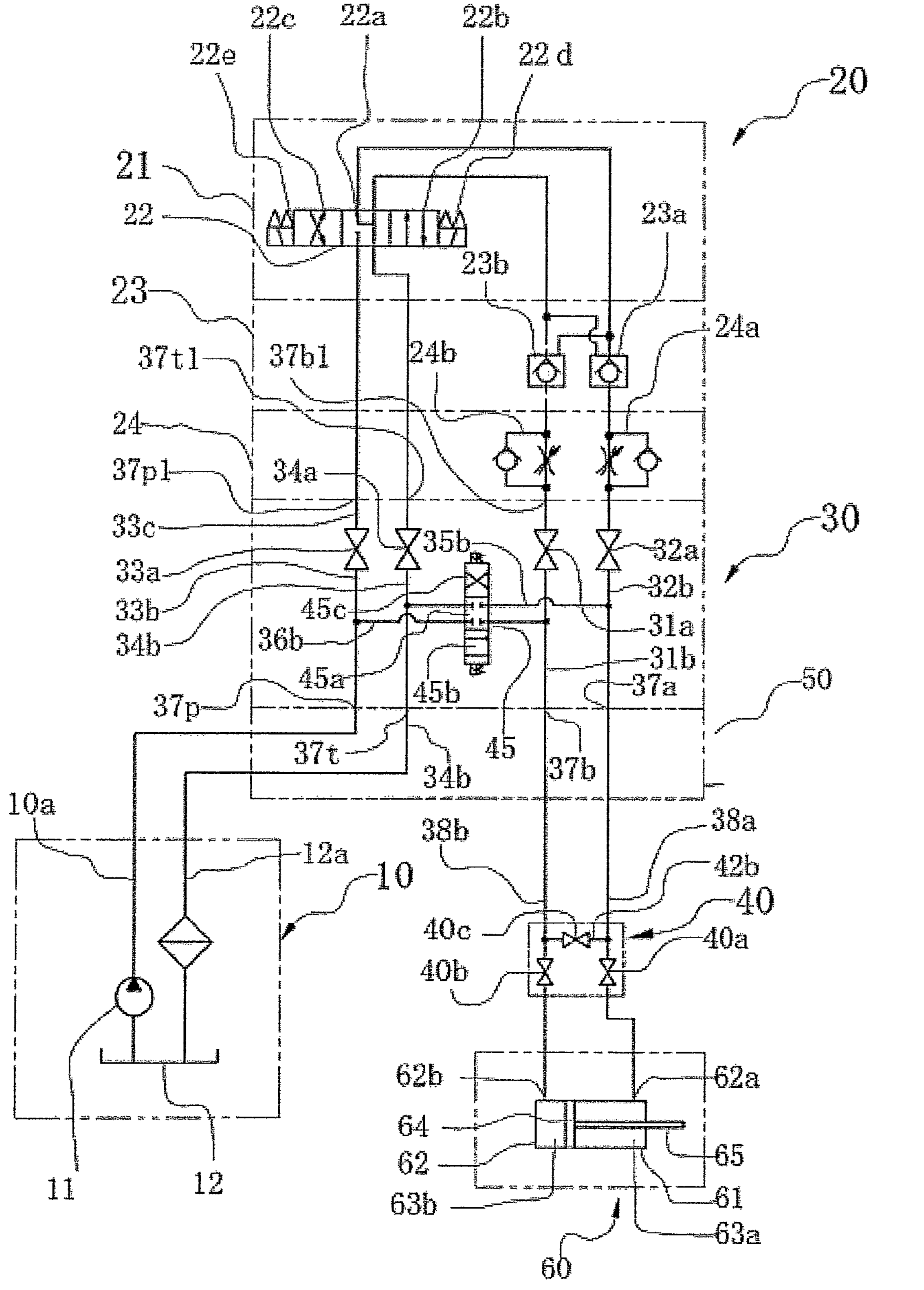
FIG. 8 is a diagram of a hydraulic circuit of a second embodiment of the present invention.
Figure 9:
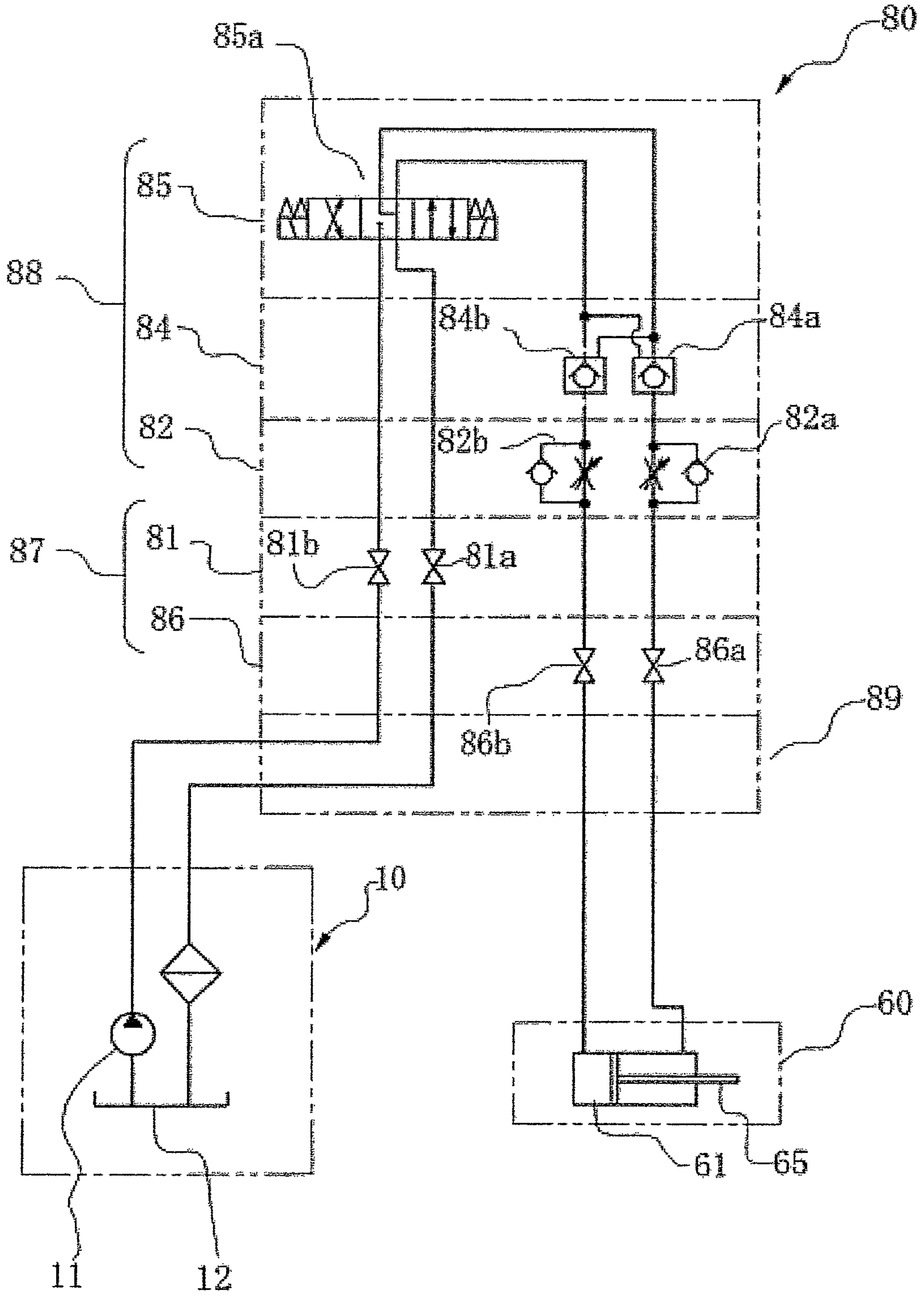
FIG. 9 is a diagram of a hydraulic circuit of a conventional art.

FIG. 8 illustrates a circuit diagram of a second embodiment. When the tank-side bypass stop valve 35*a* and the pump-side bypass stop valve 36*a* of the composite valve 30 are replaced to a direction switching valve 45 as shown in FIG. 8, a trial run of the hydraulic cylinder 61 is performed for the extending and contracting directions, through operation on the direction switching valve 45. Note that, the direction switching valve 45 has the three positions of: a neutral position 45*a*; a first position 45*b*; and a second position 45*c*; however, the direction switching valve may be a two-position type direction switching valve having the neutral position and either one of the first and second positions.

When the direction switching valve 45 is shifted to the neutral position 45*a* as shown in the figure, the tank-side bypass circuit 35*b* and the pump-side bypass circuit 36*b* are closed, and therefore the hydraulic cylinder 61 remains stopped.

When the direction switching valve 45 is shifted to the first position 45*b*, the tank-side bypass circuit 35*b* and the pump-side bypass circuit 36*b* are opened, and thereby the head-side pressure chamber 63*b* communicates with the hydraulic pump 11, and the tank 12 communicates with the rod-side pressure chamber 63*a*, so that the rod 65 operates in the extending direction.

Meanwhile, when the direction switching valve 45 is shifted to the second position 45*c*, the tank-side bypass circuit 35*b* establishes communication between the tank-side passage 34*b* and the multifunction valve-side first passage 31*b*, and the pump-side bypass circuit 36*b* establishes communication between the pump-side passage 33*b* and the multifunction valve-side second passage 32*b*. As a result, the rod-side hydraulic chamber 63*a* communicates with the hydraulic pump 11, and the tank 12 communicates with the head-side hydraulic chamber 63*b*, and therefore the rod 65 operates in the contracting direction.

Furthermore, when the third stop valve 40*c* of the multifunction valve 40 is opened with the other valves (the first stop valve 40*a* and the second stop valve 40*b*) closed, the supply/discharge of the hydraulic oil to/from the hydraulic cylinder 61 is stopped. However, the bypass circuit 42*b* of the multifunction valve 40 allows the first supply/discharge circuit 38*a* to communicate with the second supply/discharge circuit 38*b*, and this makes it possible to perform flushing on the first supply/discharge circuit 38*a* and the second supply/discharge circuit 38*b*.

In the above flushing operation, shifting the direction switching valve 45 to the first position 45*b* causes the oil to flow in the clockwise direction, whereas shifting the direction switching valve 45 to the second position 45*c* causes the oil to flow in the counterclockwise direction. Thus, by changing the direction of the flow in flushing, hard-to-remove contamination can be flushed.

When the third stop valve 40*c* of the multifunction valve 40 is opened with its remaining stop valves closed, it is possible to completely separate the hydraulic device 60 including the hydraulic cylinder 61 from the stack valve 20 and from the hydraulic power supplier 10, to perform repair, inspection, and/or maintenance on the hydraulic cylinder 61.

The above-described operation of repair, inspection, and/or maintenance on the stack valve 20 and the hydraulic cylinder 61 is performed after the stack valve 20 and the hydraulic cylinder 61 are completely separable because of the composite valve 30 and the multifunction valve 40, and this eliminates the possibility of entry of a contaminant. In addition, during repair, inspection, and/or maintenance, there is no need to stop the hydraulic power supplier 10, and it is possible to structure a circuit for flushing. Therefore, flushing is performable in parallel with repair, inspection, and/or maintenance. Furthermore, it is possible to perform a trial run and/or operation for a slight movement of the hydraulic cylinder 61 after repair, inspection, and/or maintenance of the hydraulic cylinder 61 is/are completed and the hydraulic cylinder 61 is reattached to the multifunction valve 40.

REFERENCE SIGNS LIST

10 hydraulic power supplier
11 hydraulic pump
12 tank
20 stack valve
21 direction switching valve unit
22 direction switching valve unit
23 load check valve unit
24 speed control valve unit
26 first left passage structure
26*k* first left U-shape passage
27 first right passage structure
27*t* first T-shape passage
28 second right passage structure
28*k* second right U-shape passage
29 second left passage structure
29*k* second left U-shape passage
29*t* second T-shape passage
30 composite valve
31*a* multifunction valve-side first stop valve
31*b* multifunction valve-side first passage
32*a* multifunction valve-side second stop valve
33*a* pump-side stop valve
33*b* pump-side passage

34*a* tank-side stop valve
34*b* tank-side passage
35*a* tank-side bypass stop valve
35*b* tank-side bypass circuit
36*a* pump-side bypass stop valve
36*b* pump-side bypass circuit
40 multifunction valve
45 direction switching valve
60 hydraulic device
61 hydraulic cylinder

The invention claimed is:

1. A hydraulic circuit comprising:

a hydraulic power supplier including a tank configured to store hydraulic oil, and a hydraulic pump coupled to the tank and configured to feed hydraulic pressure oil;

a stack valve coupled to the hydraulic power supplier, the stack valve including a direction switching valve configured to control supply/discharge of the hydraulic pressure oil from the hydraulic power supplier to a hydraulic device;

a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve, wherein the composite valve includes:

a multifunction valve-side first passage including a multifunction valve-side first stop valve configured to open/close communication between the multifunction valve and the stack valve;

a multifunction valve-side second passage including a multifunction valve-side second stop valve configured to open/close communication between the multifunction valve and the stack valve;

a pump-side passage including a pump-side stop valve configured to open/close communication between the hydraulic pump and the stack valve;

a tank-side passage including a tank-side stop valve configured to open/close communication between the tank and the stack valve;

a pump-side bypass circuit branching off from the pump-side passage at a position closer to the pump than the pump-side stop valve, the pump-side bypass circuit including a pump-side bypass stop valve configured to open/close communication with the multifunction valve-side first passage; and a tank-side bypass circuit branching off from the tank-side passage at a position closer to the tank than the tank-side stop valve, the tank-side bypass circuit including a tank-side stop valve configured to open/close communication with the multifunction valve-side second passage.

2. A hydraulic circuit comprising:

a hydraulic power supplier including a tank configured to store hydraulic oil, and a hydraulic pump coupled to the tank and configured to feed hydraulic pressure oil;

a stack valve coupled to the hydraulic power supplier, the stack valve including a direction switching valve configured to control supply/discharge of the hydraulic pressure oil from the hydraulic power supplier to a hydraulic device;

a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve, wherein the composite valve includes:

a multifunction valve-side first passage including a multifunction valve-side first stop valve configured to open/close communication between the multifunction valve and the stack valve;

a multifunction valve-side second passage including a multifunction valve-side second stop valve configured to open/close communication between the multifunction valve and the stack valve;

a pump-side passage including a pump-side stop valve configured to open/close communication between the hydraulic pump and the stack valve;

a tank-side passage including a tank-side stop valve configured to open/close communication between the tank and the stack valve;

a pump-side bypass circuit branching off from the pump-side passage at a position closer to the pump than the pump-side stop valve, the pump-side bypass circuit including a pump-side bypass stop valve configured to open/close communication with the multifunction valve-side second passage; and a tank-side bypass circuit branching off from the tank-side passage at a position closer to the tank than the tank-side stop valve, the tank-side bypass circuit including a tank-side stop valve configured to open/close communication with the multifunction valve-side first passage.

3. A hydraulic circuit comprising:

a hydraulic power supplier including a tank configured to store hydraulic oil, and a hydraulic pump coupled to the tank and configured to feed hydraulic pressure oil;

a stack valve coupled to the hydraulic power supplier, the stack valve including a direction switching valve configured to control supply/discharge of the hydraulic pressure oil from the hydraulic power supplier to a hydraulic device;

a multifunction valve provided in the vicinity of the hydraulic device, the multifunction valve including (i) a first stop valve and a second stop valve which respectively open/close a first supply/discharge circuit and a second supply/discharge circuit for the hydraulic device, and (ii) a bypass circuit positioned closer to the stack valve than the first stop valve and the second stop valve, the bypass circuit including a third stop valve; and a composite valve coupled to the hydraulic power supplier, the stack valve, and the multifunction valve, wherein the composite valve includes:

a multifunction valve-side first passage including a multifunction valve-side first stop valve configured to open/close communication between the multifunction valve and the stack valve;

a multifunction valve-side second passage including a multifunction valve-side second stop valve configured to open/close communication between the multifunction valve and the stack valve;

a pump-side passage including a pump-side stop valve configured to open/close communication between the hydraulic pump and the stack valve;

a tank-side passage including a tank-side stop valve configured to open/close communication between the tank and the stack valve; and a direction switching valve configured to change a manner of communication of the pump-side passage and the tank-side passage with the multifunction valve-side first passage and the multifunction valve-side second passage.

4. A composite valve having a composite valve unit, the composite valve unit comprising:

a P-port coupled to a hydraulic pump, a T-port coupled to a tank circuit, an A-port coupled to a first supply/discharge circuit, and a B-port coupled to a second supply/discharge circuit; and a P1-port connected with the P-port, a T1-port connected with the T-port, an A1-port connected with the A-port, and a B1-port connected with the B-port, wherein the composite valve unit further comprises:

a first section including (i) a first left passage structure connecting the P-port with the P1-port, the first left passage structure including a first left U-shape passage including a lower passage provided with a pump-side stop valve, and (ii) a first right passage structure connecting the T-port with the T1-port, the first right passage structure including (a) a first right U-shape passage including a lower passage which is positioned substantially coaxially with an upper passage of the first left U-shape passage and is provided with a tank-side stop valve, and (b) a first T-shape passage which is positioned substantially coaxially with the lower passage of the first left U-shape passage and is provided with a tank-side bypass stop valve; and a second section including (i) a second right passage structure connecting the A-port with the A1-port, the second right passage structure including a second right U-shape passage including a lower passage provided with a multifunction valve-side second stop valve, and (ii) a second left passage structure connecting the B-port with the B1-port, the second left passage structure including (a) a second left U-shape passage including a lower passage which is positioned substantially coaxially with an upper passage of the second right U-shape passage and is provided with a multifunction valve-side first stop valve, and (b) a second T-shape passage which is positioned coaxially with the lower passage of the second right U-shape passage and is provided with a pump-side bypass stop valve, and wherein the first left passage structure is substantially same as the second right passage structure while the first right passage structure is substantially same as the second left passage structure when either one of the first section and the second section is rotated 180 degrees in a horizontal direction, and a pump-side bypass circuit couples the lower passage of the first left passage structure of the first section with the second T-shape passage of the second section via the pump-side bypass stop valve, while a tank-side bypass circuit couples the lower passage of the second right passage structure of the second section with the first T-shape passage of the first section via the tank-side bypass stop valve.

* * * * *